Aug. 25, 1964 W. G. PALMER 3,146,344
DEVIATION MEASURING AND COMPUTING SYSTEM
Filed Feb. 19, 1960 3 Sheets-Sheet 1

INVENTOR.
WARREN G. PALMER
BY
Alexander & Dowell
ATTORNEYS

Aug. 25, 1964  W. G. PALMER  3,146,344
DEVIATION MEASURING AND COMPUTING SYSTEM
Filed Feb. 19, 1960  3 Sheets-Sheet 3

INVENTOR.
WARREN G. PALMER
BY
Alexander & Dowell
ATTORNEYS

United States Patent Office

3,146,344
Patented Aug. 25, 1964

3,146,344
DEVIATION MEASURING AND COMPUTING SYSTEM

Warren G. Palmer, Saratoga, Calif., assignor to American Machine & Foundry Company, a corporation of New Jersey
Filed Feb. 19, 1960, Ser. No. 11,117
8 Claims. (Cl. 235—151)

This invention relates to measuring systems, and more particularly relates to means for determining the statistical deviation of measured values about a predetermined mean value, where the measured values are individually sampled periodically in a sequential manner, said deviations being expressed by the formula $$D = \sqrt{\frac{\Sigma(\overline{X} \pm x)^2}{N}}$$

where N is the number of the values sampled, $\overline{X}$ is the predetermined "target" means value, and $x$ is the measured value.

This is a special case of the more general formula for "standard deviation" expressed as $$\sigma = \sqrt{\frac{\Sigma(\overline{X} \pm x)^2}{N}}$$

where $\sigma$ represents the standard deviation, and $\overline{X}$ is the arithmetic mean, that is, the sum of all measured values divided by the total number of items measured. By selecting a predetermined or target means for $\overline{X}$ in the "standard deviation" formula, a close approximation of standard deviation is achieved. Such an approximation is perfectly adequate for industrial measurements and has the advantage of reducing the complexity of the measuring and computing apparatus needed to calculate the deviation.

Especially in connection with quality control during production of articles or bulk materials where the unit cost is low and the production rate high, it is very desirable to periodically check the product to determine whether one or more of its measurable characteristics is within tolerance, or to determine the degree and/or direction of deviation therefrom. Examples of measured values which can be thus checked include weight, density, moisture content, etc.

The present disclosure includes an illustrative embodiment of the invention specifically designed to determine the statistical deviation of cigarette weights with respect to a target mean weight. In this example the weight measurements are obtained by means of a dielectric bridge which converts weight measurements into electrical signals with a high degree of accuracy. These measurements are made by sequentially sampling equal length increments of the cigarette rod before it is cut, the equipment of the present example taking sample weights at the rate of eighteen per second and each sample being measured during a 5 millisecond interval until 2000 samples have been taken, and then converting these measured values into a number which is expressed as a percentage of the predetermined mean weight and represents the statistical deviation therefrom. These numbers are then displayed, for instance by recording on a strip so as to provide a permanent record of the statistical deviation at various instants of time during a production run. However, the present invention is not to be limited to this specific weight measurement embodiment illustrated since the system is of more general applicability.

It is a principal object of the present invention to provide a novel combination of analog computing circuits comprising the present statistical deviation measuring and calculating system, which combination of circuits converts measured values directly into statistical deviation readings substantially as quickly as the measurements are taken, thereby eliminating the delays and expense involved in determining the deviation by manually measuring individual values and then mathematically calculating the deviation employing the above mentioned formula.

Another principal object of the invention is to provide a statistical deviation measuring device including an automatic control system for programming the sequence and duration of the measurements so that the measurements are very accurate and are taken under uniform measuring conditions so that the resulting statistical deviation indications are reliable.

Yet another object of the invention is to provide a stable electronic computing system which may be relatively easily calibrated so that the calculated percentage numbers representing statistical deviation will be accurate within rather close tolerances, the system further including a novel stabilizing system which measures the amount by which the calibration drifts during each interval between sample measurements, and then automatically introduces compensation voltage into the system during each next succeeding measurement to cancel out the drift error.

A further object of the invention is to provide a measuring bridge for use with said calibrated computing system wherein the bridge normally operates unbalanced and wherein the system is relatively insensitive to the degree of unbalance of the bridge so that slow drifting of the degree of unbalance of the bridge has substantially no effect on the accuracy of the finally determined statistical deviation values.

Other objects and advantages of the present invention will become apparent during the following discussion of the drawings, wherein.

Figure 1:
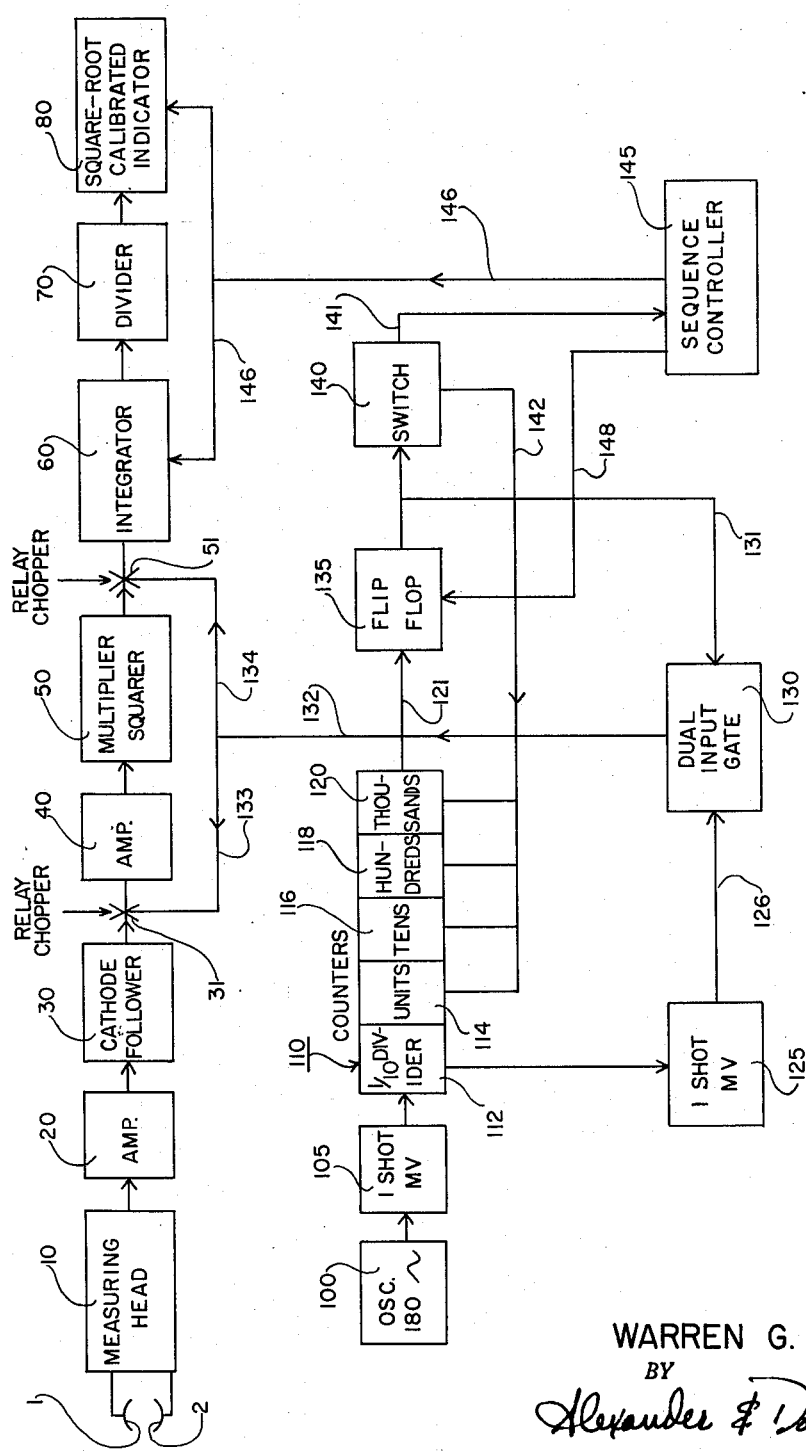
FIG. 1 is a block diagram of a cigarette weight-measuring and statistical deviation computing system embodying the present invention.

Referring now to the block diagram of FIG. 1, the apparatus includes a measuring head 10 having a pair of spaced sensing electrodes 1 and 2 connected with the head in a manner to be presently described. The output of the measuring head comprises a signal varying in amplitude according to variations in measurements taken at the electrodes 1 and 2, these measurements in this illustrative embodiment comprising weight measurements and the illustrated measuring head 10 comprising a dielectric bridge.

Briefly stated, the system operates as follows: the output from the head 10 is delivered to an A.C. amplifier 20 and then to a cathode follower amplifier circuit 30 delivering an output from which the predetermined D.C. level representing $\overline{X}$ has been removed or "subtracted." This output comprises an alternating signal component which follows the amplitude of the measurement variations of the output signal of the amplifier 20. The signal from the cathode follower amplifier is then further amplified in a controlled-gain amplifier 40 and is delivered to a voltage multiplier 50 which squares the input voltage signal and delivers the squared signals to an integrator 60. It is to be noted that by squaring the output of the amplifier 40, polarity differences are eliminated so that the output signals from the squarer 50 will be unidirectional signals representing $(\overline{X} \pm x)^2$. The integrator adds up these squared increments and delivers the sum thereof to a divider which divides the integrated sum by a number proportioned to the number of increments. Finally, the output of the divider 70 is delivered to an output unit, which in this case is an indicator 80 calibrated in terms of the square-root of the average increments.

The units 10 through 80 inclusive comprise the measuring and computing portions of the present system shown in greater detail in the schematic diagram of FIG. 2, but there is also a programming and control portion described as follows.

It is not intended that readings be taken continuously by the measuring head, but only that sample values be taken at spaced intervals so as to cover a considerable period of time. Also, it is necessary to know how many samples have been taken so that the proper division of the integrated samples can be made by the divider 70 in order to obtain an average deviation representative of the various samples taken. In order to accomplish this purpose in the illustrated embodiment, a time-reference is provided in the form of a timing oscillator 100 which is designed to run at approximately 180 cycles per second, and which may if desired be synchronized with a harmonic of the 60-cycle power line. At any frequency, the output of the oscillator 100 drives a monostable multivibrator 105 which delivers a sharp spike for each cycle and drives the counter circuit 110, this counter circuit having five counting steps including a 10-to-1 divider 112, a units counter 114, a tens counter 116, a hundreds counter 118 and a thousands counter 120.

The 10-to-1 divider 112 drives a monostable multivibrator 125 at the rate of 18 cycles per second and the latter in turn delivers a pulse to a gate circuit 130 for each output cycle of the 10-to-1 divider 112. In other words, the monostable multivibrator 125 delivers 18 pulses per second, and the time constants of this multivibrator 125 are selected such that the duration of each pulse is five milliseconds. These 18 cycle-per-second pulses, each of five milliseconds duration, are delivered to one input of the gate circuit 130 which also has a second input to be hereinafter discussed.

The output of the thousands counter 120 is delivered to a bistable multivibrator referred to as the flip-flop 135, which is reversed each time such pulse is delivered to it. In general, the counter circuits 110 are a standard type, and comprise ordinary scale-of-ten counters, except that the thousands counter 120 can be altered so as to deliver a pulse to the flip-flop 135 on less than its tenth count, for instance on its second (two thousandth) count. This flip-flop 135 is connected to the above mentioned second input to the gate circuit 130 and biases the gate either on or off depending on the condition of conductivity of the flip-flop 135. This flip-flop 135 in actual practice comprises an ordinary electronic bistable multivibrator circuit. In one of the stable conditions, the voltage applied to the gate 130 by way of the lead 131 biases the gate beyond cutoff so that it does not matter whether or not pulses are applied to the first input to the gate along lead 126. In the other position of the flip-flop 135, voltage is applied along the lead 131 to the gate 130 to bias the gate so that it can be rendered conductive by each of the five millisecond pulses delivered to the first input of the gate along the lead 126. The gate 130 when conductively energized at both inputs, then delivers a five millisecond pulse along the lead 132, which pulse closes two relay choppers 31 and 51 by way of leads 133 and 134 respectively. The relays 31 and 51 comprise normally open switches which are simultaneously closed by each five millisecond output pulse from the gate 130 and are held closed only during the five-millisecond intervals. These chopper relays 31 and 51 thereby serve to determine the duration of each sample measurement of the moving cigarette rod as it passes between the electrodes 1 and 2 so that the measurements will be taken uniformly at each sampling.

The flip-flop 135 remains in the condition of conductivity which biases the gate 130 to pass the pulses during the taking of measurement samples, but when the sample period is concluded and 2000 samples have been taken, the thousands counter 120 then delivers an output pulse through the lead 121 to the flip-flop 135 and reverses its polarity thereby biasing the gate 130 beyond cutoff and leaving the relay choppers 31 and 51 in open position regardless of the presence of five millisecond pulses at the first input to the gate circuit 130 along the lead 126.

The output from the flip-flop 135 is also connected with switch means 140, the latter having two outputs respectively along the lines 141 and 142. When the flip-flop 135 is in one condition of conductivity, wherein the gate 130 is biased so that it is responsive to the pulses coming from the one shot multivibrator 125, there is no output from the switch means 140 along the lines 141 and 142. However, when the thousands counter 120 has counted its 2000th pulse, the flip-flop 135 reverses to its other condition of conductivity and remains in this condition of conductivity, the gate circuit 130 being biased beyond cutoff so that it is no longer receptive to pulses arriving on line 126, and the switch means being triggered to deliver an output along line 141 which output cuts off the sequence controller which is merely a switching circuit for turning off the entire machine. Also, the output from the switch means 140 along the lead 142 resets the counters 114, 116, 118 and 120 to zero. The system is then cut off and remains cut off until the sequence controller 145 is again turned on to begin a new sampling run. Note that the sequence controller 145 also supplies operating power to the integrator 60 and to the square root calibrated recorder 80 along a lead 146 whenever the sequence controller is maintaining the present system in operative condition.

The switch means 140 in one practical embodiment of the invention comprises a thyratron tube having a relay in its plate circuit, which relay operates at the end of each cycle of operation to cut off the sequence controller 145 and to send a signal along the lead 142 for the purpose of resetting the counters.

When the system is to be turned on for the purpose of running a new sequence of pulses, another switch (not shown) is turned on in the sequence controller to send a signal by way of the lead 148 to the flip-flop 135 to change its condition of conductivity back again to the condition in which the switch means 140 is rendered inoperative, but the gate 130 is rendered operative, and passes the five millisecond pulses from the multivibrator 125 to close the chopper relays 31 and 51.

The control portion of the present system which comprises the lower portion of FIG. 1 is made up of a plurality of counters and switching circuits including gates and multivibrators of known types, and therefore it is not believed necessary that any of these circuits be described in detail per se.

*Computer*

Figure 2:
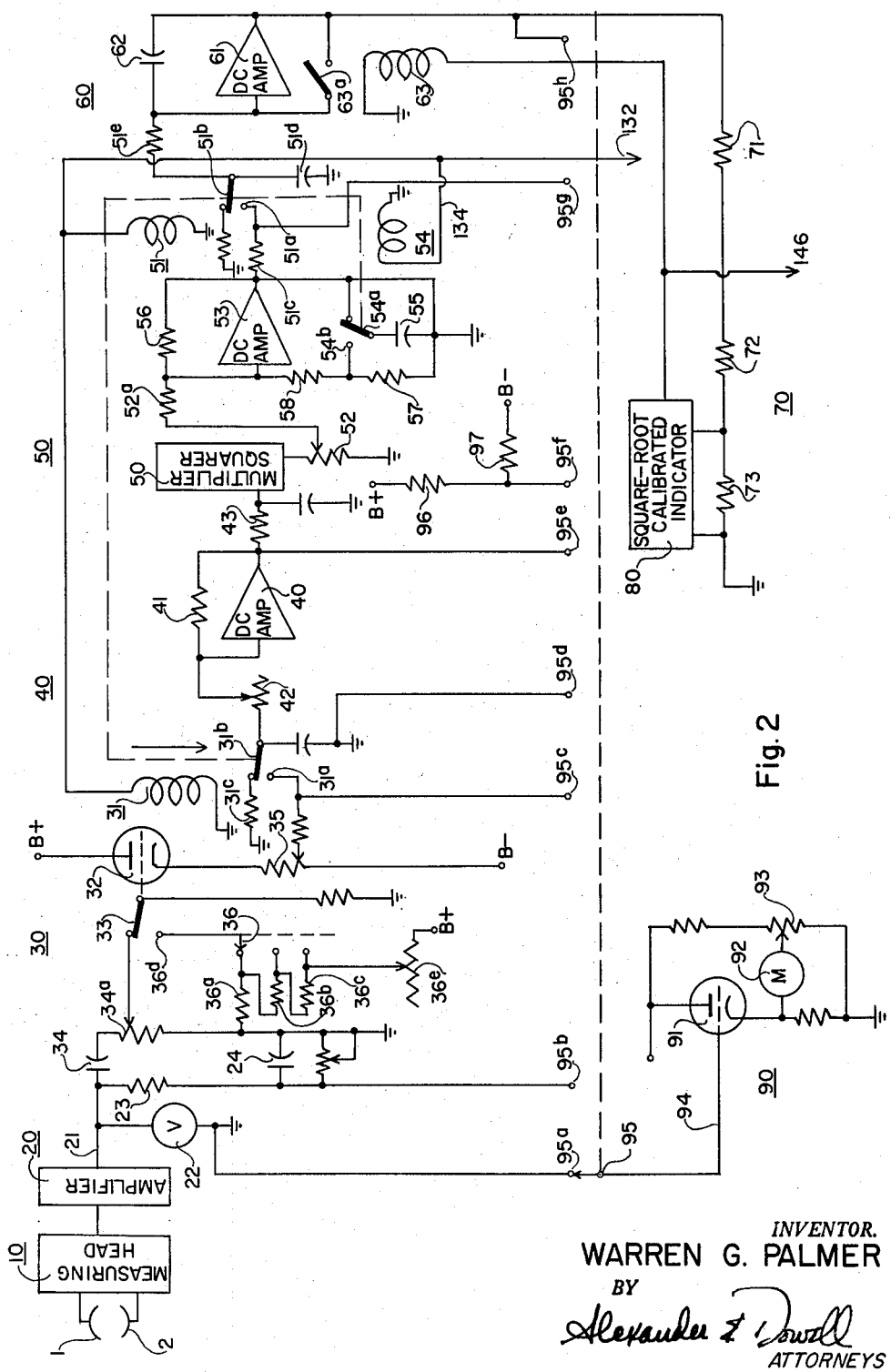
FIG. 2 is a schematic diagram showing in greater detail the computer portion of the system embodying the present invention.

Turning now to the schematic diagram shown in FIG. 2, it will be seen that this diagram corresponds with only the upper portion of the block diagram of FIG. 1, namely the measuring, the computing circuits and the recorder. The measuring head 10 is shown connected with two dielectric bridge plates 1 and 2 and will be described in greater detail in connection with FIG. 3. The head 10 is connected to an amplifier 20 which amplifies the output of the measuring head and delivers a signal of usable amplitude to the cathode follower circuit 30, which includes a cathode follower tube 32. The grid of this tube is connected through a switch 33 to a blocking condenser 34 serving as a coupling means which establishes the target mean weight value as a D.C. component of the output of the amplifier 20. It passes only the alternating current signal component fluctuating around that value which contains all of the information by which the value of $(\bar{\bar{X}} \pm x)$ for each measurement is determined, since subtraction of the D.C. component from the complex wave necessarily performs the calculation of ($\overline{\overline{X}} \pm x$). A potentiometer 34a is provided in this circuit so that the amplitude of the voltage fed into the cathode follower 32 can be adjusted for the purpose of calibration, as will be hereinafter described. The output of the cathode follower 30 is tapped off of a potentiometer 35 which also serves as a calibration adjustment. The entire calibration operation will be described in detail hereinafter.

The output from the potentiometer 35 is then delivered to the terminal 31a of the chopper relay 31, the switch arm 31b of which is connected to a direct-coupled amplifier 40. In the "open" position of the chopper relay 31, its arm 31b is maintained at ground potential by a resistor 31c. This amplifier is provided with a feedback path comprising the feedback resistor 41 which feeds back enough voltage to make the amplifier stable. The precise gain of this amplifier can be controlled relatively easily by the potentiometer 42. The output of the amplifier 40 is delivered from a coupling resistance 43 to a multiplier squarer 50. This squarer 50 is a standard circuit having two inputs such that when the same voltage is applied at both inputs, the output represents the square of the two input voltages. The precise level of the output of the squarer is adjustable by means of a potentiometer 52 and this output is delivered through a resistor 52a into a second direct-coupled amplifier 53 comprising a stabilizing unit which operates as follows.

The output of the D.C. amplifier 53 normally should be zero during intervals when the relays 31 and 51 are open and no signal is being transmitted from the measuring head 10 to the squarer circuit 50, but in reality there will generally be a small D.C. error appearing at the output of the D.C. amplifier 53 due to improper calibration or drifting of the circuit. A stabilizer relay 54 is provided having its winding connected in parallel with the relays 31 and 51 so that it operates simultaneously therewith.

The arm 54a of the relay 54 is shown in its normal position wherein the condenser 55 is charged to the level of the error appearing at the output of the D.C. amplifier 53 between input signals. However, when a sample measurement is being made and the chopper relays 31 and 51 are closed, the relay 54 is also moved to its other position wherein the condenser 55 is connected to the terminal 54b and therefore is connected to the input of the D.C. amplifier 53. The amplifier 53 is so designed that the output and input are mutually 180° out of phase, so that the condenser 55 can be changed during each relatively long interval between measurement pulses to the D.C. error level of the output of the amplifier 53, and then can be switched and applied across the input to the amplifier 53 for each relatively brief measuring interval, which switching of the condenser 55 applies a correction voltage to the input to the amplifier 53 by way of the voltage divider chain 57–58. By this means, any D.C. error in calibration of the circuits is automatically cancelled during each measurement made by the system. A feedback resistor 56 further stabilizes the amplifier 53.

The output of the squarer 50 is then applied to the relay chopper 51 at the terminal 51a through a resistor 51c, and the arm 51b of the relay 51 connects with the output of the circuit at this terminal. This output is then applied through time constant means 51d and 51e to an integrator 60 comprising an amplifier 61 having a condenser 62 connected thereacross and serving to store the electrical charges from each of the 2000 measurements to provide an integrated output. Relay means 63 has a switch means 63a connected across the integrating condenser 62 for the purpose of shortcircuiting the same and discharging the condenser 62 after each 2000 samples have been taken and the standard deviation computed therefrom. The relay 63 may be connected to the sequence controller 145 by lead 146, FIG. 1, and actuated by the same means which actuates the recorder 80 to turn the latter off at the end of the computing sequence.

The divider circuit 70 comprises a simple chain of resistances 71, 72 and 73 which divides the output by a value representing N. As stated above, the recorder 80 is calibrated in terms of the square root of the integrated and divided voltage representing the percent deviation over the 2000 samples.

The amplifiers, the multiplier-squarer, and the recorder are all considered standard circuits and therefore no precise description is made in this specification with respect thereto.

Calibration

A calibration means for the present computing circuits is also illustrated in the schematic diagram of FIG. 2. An electronic meter circuit 90 is employed using a triode 91 having a meter 92 connected in a known manner in its cathode-plate circuit and having a potentiometer 93 for the purpose of balancing the current out of the meter 92 and providing a null reading in this meter when the grid 94 of the triode is at ground potential. A test switch 95 includes a series of nine terminals labeled 95a to 95h, inclusive. In positions 95a and 95d the grid lead 94 of the tube 91 is grounded and the reading on the meter 92 will be zero. These positions serve to permit easy checking of the adjustment of the meter circuit per se.

The position 95b will be discussed hereinafter in connection with the measuring head circuit illustrated in FIG. 3 and described hereinafter.

Referring now to the cathode follower circuit 30, it will be seen that a chain of resistances 36a, 36b and 36c are connected with the terminals of a switch 36 so as to supply several different input voltages to the terminal 36d of the switch 33 at the grid of the cathode follower tube 32. These are calibrating voltages including zero, 2 volts, 4 volts and 6 volts which are obtained from the relative values of the chain of resistors 36a through 36c as further determined by the setting of the potentiometer 36e which is connected with a source of stable voltage supply. When the circuit is properly calibrated, if the switch 33 is moved so that its wiper connects with the terminal 36d, the output of the system as indicated at the recorder should respectively read zero, 2 volts, 4 volts, or 6 volts depending on the setting of the switch 36. By this means the general calibration of the entire system can be easily checked.

When no input is applied to the cathode follower grid and the calibrating switch 95 is moved so that it connects with terminal 95c, the potentiometer 35 is then adjusted until the meter 92 reads zero. Note that there are two regulated power supplies of opposite polarity and each having one grounded terminal, and that the cathode follower tube 32 is connected between +300 volts and −300 volts supply rather than connected between one of these supplies and ground, and therefore a point can be found on the cathode potentiometer 35 at which the meter 92 will read zero. The supply voltages 300+ and 300− are carefully regulated so as to maintain the calibration at terminal 95c. Then the switch 95 is moved to contact terminal 95e, and the potentiometer 42 is adjusted until the output voltage of the D.C. amplifier 40 at terminal 95e reads zero.

The switch 95 is then moved to contact the terminal 95f, which is connected by way of resistors 96 and 97 between the +300 volts supply and the −300 volts supply in order to determine when these two opposite-polarity power supplies are properly adjusted so that the zero position therebetween exactly corresponds with the ground potential of the chassis, the common leads of the two regulated supplies as stated above being both connected to ground of the chassis.

In the position of the switch 95 wherein it is connected with the contact 95e, the input to the multiplier was set to equal zero. If the switch is then moved to connect with contact 95g at the output of the squarer circuit 50, the meter should then also read zero. This reading is accomplished by adjustment of the potentiometer 52. Similarly, when the switch 95 is moved to connect with contact 95h, if the input to the integrator is zero at contact 95g, the output of the integrator should then also be zero at contact 95h. The test contact 95h then serves to determine proper operation of the integrator.

As stated above, with zero input to the grid of the cathode follower tube 32, the recorder 80 should read zero. If the switch 36 is then moved to the 2-volt position, the recorder 80 should then read 2 volts. Likewise, when the switch 36 is moved to the 4-volt or 6-volt position, corresponding readings should appear at the recorder 80.

*Measuring Head*

Figure 3:
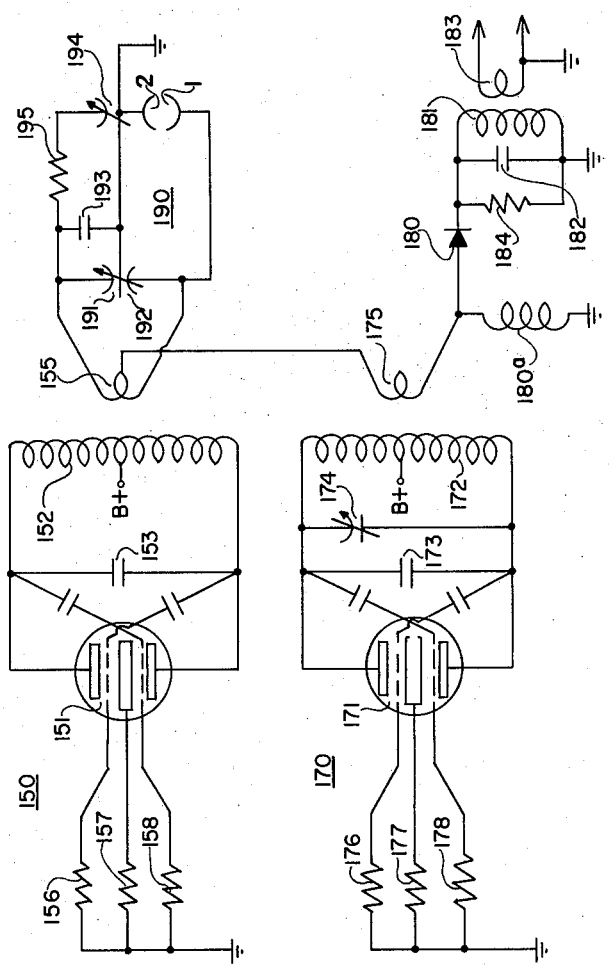
FIG. 3 is a schematic diagram of a measuring-head bridge circuit suitable for sampling the weights of cigarettes in a system according to FIG. 1.

Referring now to FIG. 3, the measuring head is connected with the capacitive electrodes 1 and 2. The head comprises two radio frequency oscillators 150 and 170. These two oscillators are high-frequency oscillators employing dual high-frequency triodes 151 and 171, respectively, each having a tank circuit, the tank in the oscillator 150 being turned to 100 megacycles and comprising an inductance 152 and a tuning capacitor 153 in a push-pull circuit, fed by B+ at the center tap of the coil. The oscillator 170 includes an inductance 172, a fixed tuning condenser 173 and an adjustable padder 174. Suitable feedback condensers are provided between each of the grids in the tubes and the extreme ends of the tank circuits of the respective oscillators. Proper bias on the cathodes and the grids of the tubes is provided by fixed resistors 156, 157, 158 and 176, 177 and 178 connected between the various elements and ground, these elements not being provided with reference numerals in FIG. 3 in view of the fact that the oscillators per se are considered conventional. The oscillator tank 152 is tuned to 100 megacycles and the oscillator tank 172 is tuned to 110.7 megacycles and pick-up coils 155 and 175, respectively, are placed near each of the tanks 152 and 172 serving as outputs. The pickup coils 155 and 175 are connected mutually in series with a diode mixer circuit which includes a diode 180 connected between an RF choke 180a and an output filter circuit including a coil 181 and a condenser 182, respectively tuned to 10.7 megacycles and loaded by a resistor 184 to obtain satisfactory band width. The output from the measuring head appears across a winding 183 which is connected with a conventional IF amplifier 20, FIG. 1, tuned to 10.7 megacycles and having a detector at its output so that the voltage appearing at the lead 21 in FIG. 2 is a demodulated potential fluctuating according to the amplitude of the output voltage from the mixer tuned circuit 181–182.

Still referring to FIG. 2, a voltmeter 22 is connected across the detected output of the IF amplifier 20 and reads in terms of the peak instantaneous unbalanced-bridge voltages. The calibrating switch terminal 95b is also connected through a resistance divider 23, 23a with the rectified output of the IF amplifier 20, and the resistor 23 and condenser 24 serve as a time constant for removing fluctuations from the output signal of the measuring bridge so as to provide an average level from which the average unbalance of the measuring head bridge can be determined. As stated above, this bridge is always operated in unbalanced condition and it is generally desirable that the output level from the IF amplifier 20 equal approximately 60–70 volts so that the fluctuations at this level and corresponding with the measurements being taken are of sizeable magnitude.

Referring again to FIG. 3, the bridge circuit itself comprises a capacitive bridge which is symmetrical about ground. The trimmer capacitors 191–192 both are adjustable and are driven in opposite phase directions by the output from the center tapped winding 155. The upper portion of the bridge further includes a condenser 193 and a trimmer condenser 194, which trimmer condenser is located on opposite sides of the ground level of the bridge from the contact probes 1 and 2 which likewise form the plates of a condenser. The resistance 195 serves to balance the resistive component introduced into the bridge caused by the fact that measurements are made of a dielectric comprising paper and tobacco passing in the form of a cigarette rod between the capacitive plates of the measuring electrodes, the tobacco being an imperfect dielectric and therefore having a resistive component. Adjustment of the trimmer condenser 194 can be made to bring the bridge into balance by drawing a resistive component through the resistor 195. The capacitive and resistive components of the bridge formed by the condensers 193–194 and by the resistor 195 should approximately equal the capacitive and resistive components appearing between the test electrodes 1 and 2. If the bridge 190 is in perfect balance, no 100-megacycle component of current will flow to the mixer 180, and therefore the output of the measuring head will be zero. However, the bridge 190 is deliberately unbalanced so that a component at 100 megacycles is always present. Therefore, as the cigarette rod passes the electrodes 1 and 2 it merely amplitude modulates the voltage transmitted to the mixer from the winding 155 and therefore varies the output amplitude from the mixer at the winding 183. In other words, the output is always 10.7 megacycles, and only the amplitude thereof is varied by the passage of the cigarette rod between the test electrodes 1 and 2.

The present invention is not to be limited to the precise embodiments illustrated in the drawings, for changes may be made therein within the scope of the following claims.

I claim:

1. In a statistical deviation measuring system of the type having operating means for measuring deviations of selected values about a predetermined mean value and translating said measured values into alternating signals, and having plural operating means for squaring said alternating signals, integrating said squared signals, and dividing said integrated signals by a signal representative of a selected constant, control apparatus for said system operative to cause said system to derive the statistical deviation of discrete measured values of a selected portion of each sample of a plurality of successively moving, discrete samples comprising, timing means for generating a predetermined number of uniformly spaced control pulses, the spacing between said pulses being representative of the time spacing between said measured values of said selected portion of each successively moving sample, means connected to said timing means for chopping said alternating signals into discrete segments representative of said discrete measured values, and actuating means connected to said system operating means and said timing means and operative to actuate said system operating means concurrently each time a pulse is generated.

2. The invention defined in claim 1, wherein said control apparatus includes means connected to said timing means for causing said integrating means to integrate signals representative of only a predetermined number of said discrete, measured values, and further includes means for adjusting said dividing means to divide said predetermined number of integrated signals by a signal representative of said predetermined number of discrete portions.

3. The invention defined in claim 1, said timing means comprising pulse forming means connected with said generating means for forming said control pulses, said forming means having a time constant determining the durations of said control pulses, pulse counter means for counting pulses up to said predetermined number and delivering a trigger signal when said number is counted, and sequence controller means connected with said counter means for shutting off said system in response to said trigger signal.

4. The invention defined in claim 3, including relay means having switch contacts connected across said integrator means, said relay means being connected with said sequence controller means whereby the relay means is actuated thereby to discharge said integrator means in response to said trigger signal.

5. The invention defined in claim 3, a counter reset circuit connected between said counter means and said sequence controller means whereby the latter will reset said counter to zero in response to said trigger signal.

6. In a statistical deviation measuring system of the type having operating means for measuring deviations of selected values about a predetermined mean value and translating said measured values into alternating signals, and having plural operating means for squaring said alternating signals, integrating said squared signals, and dividing said integrated signals by a signal representative of a selected constant, the improvement in said measuring means comprising in combination, two oscillators having tank circuits fixed-tuned to different frequencies, mixer means, detector means coupled with the mixer means for delivering a signal proportional to a mixed component of the frequencies of said two oscillators, and network means coupling said oscillators to said mixer means and comprising first and second windings coupled with said tank circuit respectively, the first winding having its ends connected between a center tap of the second winding and one input terminal of the mixer whose other terminal is grounded, and the ends of the second winding being connected across a bridge comprising two capacitive legs each having one terminal grounded, and capacitive measuring electrodes comprising at least part of the capacity of said legs.

7. In a statistical deviation measuring system of the type having operating means for measuring deviations of selected values about a predetermined mean value and translating said measured values into alternating signals, and having plural operating means for squaring said alternating signals, integrating said squared signals, and dividing said integrated signals by a signal representative of a selected constant, and output means for deriving the square root of said integrated and divided signals, control apparatus for said system operative to cause said system to derive the statistical deviation of discrete measured values of a selected portion of each sample of a plurality of successively moving, discrete samples comprising, timing means for generating a predetermined number of uniformly spaced control pulses, the spacing between said pulses being representative of the time spacing between said measured values of said selected portion of each successively moving sample, and chopper switch means interposed between at least two of said operating means and normally interrupting the flow of signals from the measuring means to the output means, said chopper switch means being connected with said timing means and controlled by said control pulses to complete the circuit between said adjacent means during each control pulse and for the duration thereof, thereby taking sample measurements at regular intervals and for uniform time durations.

8. The invention defined in claim 7, drift error compensation means comprising relay means connected with said timing means and actuated by said control pulses, said relay means having a switch arm associated with a normally closed fixed contact connected with the output of an amplifier appearing in the system beyond said chopper switch means and a normally open fixed contact connected with the input of the same amplifier, and a capacitor connected between said arm and ground, whereby the capacitor will be charged to the level of the actual output of the amplifier between pulses and its potential will be applied to the amplifier input as a corrective compensation during each pulse.

References Cited in the file of this patent

UNITED STATES PATENTS

| | | |
|---|---|---|
| 2,853,235 | Brinster et al. | Sept. 23, 1958 |
| 2,965,300 | Radley | Dec. 20, 1960 |
| 3,063,635 | Gordon | Nov. 13, 1962 |